(12) United States Patent
Reunamäki et al.

(10) Patent No.: US 8,874,710 B2
(45) Date of Patent: Oct. 28, 2014

(54) ACCESS NETWORK DISCOVERY

(75) Inventors: Jukka Pekka Reunamäki, Tampere (FI); Petri Antero Tuominen, Ruutana (FI)

(73) Assignee: Nokia Corporation, Espoo (FI)

( * ) Notice: Subject to any disclaimer, the term of this patent is extended or adjusted under 35 U.S.C. 154(b) by 765 days.

(21) Appl. No.: 12/768,039

(22) Filed: Apr. 27, 2010

(65) Prior Publication Data

US 2011/0264780 A1    Oct. 27, 2011

(51) Int. Cl.
*G06F 15/173* (2006.01)
*H04L 29/08* (2006.01)
*H04W 84/12* (2009.01)
*H04W 48/16* (2009.01)
*H04W 8/00* (2009.01)

(52) U.S. Cl.
CPC ............... *H04L 67/16* (2013.01); *H04W 84/12* (2013.01); *H04W 48/16* (2013.01); *H04W 8/005* (2013.01)
USPC .......................... 709/223; 709/200; 709/224

(58) Field of Classification Search
CPC ..... G06F 15/173; H04L 67/16; H04W 8/005; H04W 84/12; H04W 48/16
USPC ......................................... 709/200, 223, 224
See application file for complete search history.

(56) References Cited

U.S. PATENT DOCUMENTS

| | | | |
|---|---|---|---|
| 5,418,538 A * | 5/1995 | Lau | 342/357.75 |
| 5,663,734 A * | 9/1997 | Krasner | 342/357.25 |
| 5,663,735 A * | 9/1997 | Eshenbach | 342/357.62 |
| 6,570,533 B2 * | 5/2003 | Syrjarinne et al. | 342/357.63 |
| 6,885,337 B2 * | 4/2005 | Jendbro et al. | 342/357.4 |
| 7,263,552 B2 * | 8/2007 | Govindarajan et al. | 709/224 |
| 7,590,424 B2 * | 9/2009 | Yamamoto et al. | 455/456.1 |
| 7,940,726 B2 * | 5/2011 | Olsson et al. | 370/331 |
| 7,986,267 B2 * | 7/2011 | del Castillo et al. | 342/357.46 |
| 8,081,107 B2 * | 12/2011 | Kosolobov et al. | 342/357.62 |
| 8,145,234 B1 * | 3/2012 | Leonard et al. | 455/456.1 |
| 8,145,239 B2 * | 3/2012 | Savoor | 455/456.3 |
| 8,185,152 B1 * | 5/2012 | Goldner | 455/552.1 |
| 8,193,979 B2 * | 6/2012 | McBurney | 342/357.44 |
| 8,214,745 B2 * | 7/2012 | Chapman | 715/751 |
| 8,229,462 B2 * | 7/2012 | Bennett, Jr. | 455/456.1 |
| 8,350,755 B2 * | 1/2013 | Abraham et al. | 342/357.42 |
| 2001/0055975 A1 * | 12/2001 | McDonnell et al. | 455/456 |
| 2004/0023666 A1 * | 2/2004 | Moon et al. | 455/456.1 |
| 2004/0185870 A1 * | 9/2004 | Matsuda | 455/456.1 |
| 2005/0048986 A1 * | 3/2005 | Zhao et al. | 455/456.1 |
| 2005/0116858 A1 * | 6/2005 | Odamura | 342/357.09 |
| 2006/0035646 A1 * | 2/2006 | Fox et al. | 455/456.1 |
| 2006/0268711 A1 * | 11/2006 | Doradla et al. | 370/235 |
| 2006/0268795 A1 * | 11/2006 | Tamaki | 370/338 |
| 2007/0016649 A1 * | 1/2007 | Nishiki | 709/206 |
| 2007/0096981 A1 * | 5/2007 | Abraham | 342/357.15 |
| 2007/0100549 A1 * | 5/2007 | Kawakami et al. | 701/214 |

(Continued)

FOREIGN PATENT DOCUMENTS

EP    1783929 A1 *  5/2007    ............ H04W 4/04

*Primary Examiner* — Anthony Mejia
(74) *Attorney, Agent, or Firm* — Locke Lord LLP

(57) ABSTRACT

In accordance with an example embodiment of the present invention, access network discovery information is received from an access network discovery and selection function server, access network discovery assistance information is received from a separate server, and the received access network discovery and access network discovery assistance information is used in network discovery.

18 Claims, 4 Drawing Sheets

(56) References Cited

U.S. PATENT DOCUMENTS

| | | | |
|---|---|---|---|
| 2007/0139265 A1* | 6/2007 | Monnerat | 342/357.15 |
| 2007/0202874 A1* | 8/2007 | Shon | 455/433 |
| 2008/0064380 A1* | 3/2008 | Niemenmaa et al. | 455/414.2 |
| 2008/0126498 A1* | 5/2008 | Doshi et al. | 709/208 |
| 2008/0227463 A1* | 9/2008 | Hizume et al. | 455/456.1 |
| 2008/0228654 A1* | 9/2008 | Edge | 705/71 |
| 2008/0266174 A1* | 10/2008 | Medina Herrero | 342/357.07 |
| 2009/0005062 A1* | 1/2009 | Takaku et al. | 455/456.1 |
| 2009/0088182 A1* | 4/2009 | Piersol et al. | 455/456.1 |
| 2009/0158387 A1* | 6/2009 | Huang | 726/1 |
| 2009/0203386 A1* | 8/2009 | Edge et al. | 455/456.1 |
| 2009/0207812 A1* | 8/2009 | Gupta et al. | 370/332 |
| 2009/0247111 A1* | 10/2009 | Sennett et al. | 455/404.1 |
| 2009/0247116 A1* | 10/2009 | Sennett et al. | 455/404.2 |
| 2009/0274069 A1* | 11/2009 | Olsson et al. | 370/255 |
| 2009/0291673 A1* | 11/2009 | Chauvigne et al. | 455/414.3 |
| 2009/0309790 A1* | 12/2009 | Farmer et al. | 342/357.09 |
| 2009/0325611 A1* | 12/2009 | Halivaara et al. | 455/466 |
| 2010/0003980 A1* | 1/2010 | Rune et al. | 455/436 |
| 2010/0039323 A1* | 2/2010 | Kosolobov et al. | 342/357.13 |
| 2010/0069062 A1* | 3/2010 | Horn et al. | 455/434 |
| 2010/0117898 A1* | 5/2010 | Wigren | 342/357.09 |
| 2010/0217845 A1* | 8/2010 | Doshi et al. | 709/221 |
| 2010/0253577 A1* | 10/2010 | Fujiwara et al. | 342/357.42 |
| 2010/0273478 A1* | 10/2010 | Shon | 455/432.1 |
| 2010/0311438 A1* | 12/2010 | Edge et al. | 455/456.1 |
| 2011/0044293 A1* | 2/2011 | Nagasawa et al. | 370/332 |
| 2011/0072101 A1* | 3/2011 | Forssell et al. | 709/206 |
| 2011/0098057 A1* | 4/2011 | Edge et al. | 455/456.1 |
| 2011/0117925 A1* | 5/2011 | Sampath et al. | 455/456.1 |
| 2011/0140960 A1* | 6/2011 | Wirola et al. | 342/357.42 |
| 2011/0140962 A1* | 6/2011 | McNamara et al. | 342/357.64 |
| 2011/0173674 A1* | 7/2011 | Thomson et al. | 726/1 |
| 2011/0177831 A1* | 7/2011 | Huang | 455/457 |
| 2011/0187525 A1* | 8/2011 | Bhattacharya et al. | 340/539.13 |
| 2011/0190004 A1* | 8/2011 | Tenny et al. | 455/456.1 |
| 2011/0201347 A1* | 8/2011 | Abraham et al. | 455/456.1 |
| 2011/0201358 A1* | 8/2011 | Karaoguz et al. | 455/456.3 |
| 2011/0201360 A1* | 8/2011 | Garrett et al. | 455/457 |
| 2011/0222471 A1* | 9/2011 | Abraham et al. | 370/328 |
| 2011/0256875 A1* | 10/2011 | Edge et al. | 455/440 |
| 2011/0286437 A1* | 11/2011 | Austin et al. | 370/338 |
| 2011/0287793 A1* | 11/2011 | Tenny et al. | 455/507 |
| 2011/0306356 A1* | 12/2011 | Aoyama et al. | 455/456.1 |
| 2012/0003994 A1* | 1/2012 | Sylvain | 455/456.1 |
| 2012/0015654 A1* | 1/2012 | Palanki et al. | 455/435.1 |
| 2012/0136623 A1* | 5/2012 | Edge et al. | 702/150 |
| 2012/0178443 A1* | 7/2012 | Zhu et al. | 455/432.1 |
| 2012/0315869 A1* | 12/2012 | Bharatia et al. | 455/404.2 |
| 2012/0331297 A1* | 12/2012 | Shen et al. | 713/171 |

\* cited by examiner

ACCESS NETWORK DISCOVERY

TECHNICAL FIELD

The present application relates generally to access network discovery.

BACKGROUND

Access technologies of various kinds are becoming increasingly ubiquitous. This is the case for both wired and wireless communication, especially for wireless communication. Examples include GSM/GPRS/EDGE, WCDMA/HSPA, WLAN/Wi-Fi, WiMAX, LTE for wireless communication, and USB, etc. for wired communication, and so on. Terminals offered by different vendors match this multitude of access technologies by including ever more access interfaces to allow greater freedom and flexibility in selection of access to use for each communication session.

SUMMARY

Various aspects of examples of the invention are set out in the claims.

According to a first aspect of the invention there is provided an apparatus, comprising:
  a receiver module configured to receive
  access network discovery information from an access network discovery and selection function server and
  access network discovery assistance information from a second server separate from the access network discovery and selection function server; and
  a processor configured to use the received access network discovery and access network discovery assistance information in network discovery.

The receiver module may comprise a first receiver configured to receive information from the access network discovery and selection function server and a second receiver configured to receive information from the second server. Alternatively, the receiver module may comprise a single receiver configured to receive from both servers.

In certain example embodiments, the apparatus is an apparatus capable of using a plurality of different access methods (or is configured to use a set of different access methods). In certain example embodiments, these access methods consist of wireless access methods. In other embodiments, the access methods comprise both wireless and wired access methods. In yet other embodiments, the access methods consist of wired access methods. In certain example embodiments, the apparatus is a mobile communication device capable of using (or configured to use) at least one wireless access method or at least two wireless access methods. In certain example embodiments, the apparatus is a mobile communication device capable of using (or configured to use) at least one wireless access method or at least two wireless access method(s), and at least one wired access method. The apparatus may be a mobile phone or mobile terminal of a cellular network.

In an example embodiment, the access network discovery information comprises information on available networks. In an example embodiment, the information on available networks comprises a list of one or more networks and their mutual priority.

In an example embodiment, the access network discovery information comprises one or more parameters to be used in network discovery.

In an example embodiment, the apparatus is configured to request the access network discovery assistance information from the second server based on the access network discovery information received from the access network discovery and selection function server.

In an example embodiment, the access network discovery assistance information is position assistance data received from a location server, said second server forming said location server. In an example embodiment, the access network discovery assistance information is dynamic data updated by said second server.

In an example embodiment, the access network discovery assistance information is selected from the group consisting of: cell identifier(s), coordinates of one or more access points in the area, and received signal strength indicator of specified cell(s) as identified by the cell identifier(s).

In an example embodiment, the access network discovery assistance information comprises information about a plurality of access points located close to the same geographical location as the apparatus.

According to a second aspect of the invention there is provided a method, comprising:
  receiving access network discovery information in an apparatus from an access network discovery and selection function server;
  receiving access network discovery assistance information in said apparatus from a second server separate from the access network discovery and selection function server; and
  using by said apparatus the received access network discovery and access network discovery assistance information in network discovery.

In an example embodiment, the method comprises using a separate server to store position assistance data.

In an example embodiment, the method comprises using information stored to a secure user plane location server. In an example embodiment, the method comprises using information stored to such a SUPL server used for location estimation to define where an access point, such as a WLAN access point, can be found more precisely.

In an example embodiment, the method comprises requesting the access network discovery assistance information from the second server based on the access network discovery information received from the access network discovery and selection function server.

According to a third aspect of the invention there is provided an apparatus, comprising:
  a memory configured to store access network discovery assistance information; and
  a transmitter configured to transmit the access network discovery assistance information to a mobile communication device to assist in network discovery, the apparatus being separate from an access network discovery and selection function server that sends access network discovery information to said mobile communication device.

In an example embodiment, the access network discovery assistance information is information that is gathered from other mobile communication devices.

In an example embodiment, the apparatus is configured to transmit the access network discovery assistance information in response to receiving a request from the mobile communication device.

In an example embodiment, the access network discovery assistance information is position assistance data.

In an example embodiment, the access network discovery assistance information being selected from the group consisting of: cell identifier(s), coordinates of one or more access points in the area, and received signal strength indicator of specified cell(s) as identified by the cell identifier(s).

In an example embodiment, the access network discovery assistance information comprises information about a plurality of access points located close to the same geographical location as the mobile communication device.

According to a fourth aspect of the invention there is provided a method, comprising:

storing access network discovery assistance information in an apparatus; and transmitting the access network discovery assistance information to a mobile communication device to assist in network discovery, the apparatus being separate from an access network discovery and selection function server that sends access network discovery information to said mobile communication device.

In an example embodiment, the method comprises gathering said discovery assistance information from other mobile communication devices.

In an example embodiment, the method comprises transmitting the access network discovery assistance information in response to receiving a request from the mobile communication device.

According to a fifth aspect of the invention there is provided a computer program embodied on a computer readable medium comprising computer executable program code which, when executed by at least one processor of an apparatus, causes the apparatus to perform:

receiving access network discovery information from an access network discovery and selection function server;

receiving access network discovery assistance information from a second server separate from the access network discovery and selection function server; and using the received access network discovery and access network discovery assistance information in network discovery.

According to a sixth aspect of the invention there is provided a computer program embodied on a computer readable medium comprising computer executable program code which, when executed by at least one processor of an apparatus, causes the apparatus to perform:

storing access network discovery assistance information; and transmitting the access network discovery assistance information to a mobile communication device to assist in network discovery, the apparatus being separate from an access network discovery and selection function server that sends access network discovery information to said mobile communication device.

According to yet another example aspect of the invention there is provided an apparatus, comprising:

at least one processor; and at least one memory including computer program code the at least one memory and the computer program code configured to, with the at least one processor, cause the apparatus to perform at least the following:

receiving access network discovery information in the apparatus from an access network discovery and selection function server;

receiving access network discovery assistance information in the apparatus from a second server separate from the access network discovery and selection function server; and using the received access network discovery and access network discovery assistance information in network discovery.

According to yet another example aspect of the invention there is provided an apparatus, comprising:

at least one processor; and at least one memory including computer program code the at least one memory and the computer program code configured to, with the at least one processor, cause the apparatus to perform at least the following:

storing access network discovery assistance information in the apparatus; and transmitting the access network discovery assistance information to a mobile communication device to assist in network discovery, the apparatus being separate from an access network discovery and selection function server that sends access network discovery information to said mobile communication device.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

According to yet another example aspect of the invention there is provided a computer readable storage medium (such as a memory medium) carrying the computer program of the fifth example aspect, and sixth example aspect, correspondingly. As an example, the computer readable storage medium may be a digital data storage such as a data disc or diskette, optical storage, magnetic storage, holographic storage, phase-change storage (PCM) or opto-magnetic storage. The computer readable storage medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well. Any appropriate combinations of the embodiments may be formed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Example embodiment of the present invention and their potential advantages are understood by referring to FIGS. 1 through 6 of the drawings. In the following description, like numbers denote like elements.

As mentioned in the background section, access technologies of various kinds are becoming increasingly ubiquitous. This is the case for both wired and wireless communication, especially for wireless communication. Examples include GSM/GPRS/EDGE, WCDMA/HSPA, WLAN/Wi-Fi, WiMAX, LTE for wireless communication, and USB, etc. for wired communication, and so on.

The 3GPP (3rd Generation Partnership Project) has defined an Access Network Discovery and Selection Function (ANDSF) to assist UEs (User Equipment) in discovering and in deciding which network to access. ANDSF can be used, inter alia, for interworking of 3GPP and non-3GPP networks. The ANDSF provides two types of information for the UE; access network discovery and network selection information.

The access network discovery information is intended to help the UE to discover networks in its neighborhood. For example, access network discovery information may contain information on the network type, network ID, used radio frequency and channel. With this information, the UE may perform a network scan (i.e., discovery) more efficiently, since it does not need to go through all the possible access network technologies and frequency bands. By nature, access network discovery information may be tied to a specific location and is also more short-living than network selection information.

With access network selection information, an operator (or any other organization maintaining an ANDSF server) can affect which networks UEs are using. For example, access network selection information may contain a prioritized network list that defines the order in which the UE shall consider access networks during the network selection process. The access network selection information may remain static for a considerably long time, and the access network selection information is often referred to as policies.

Figure 1:
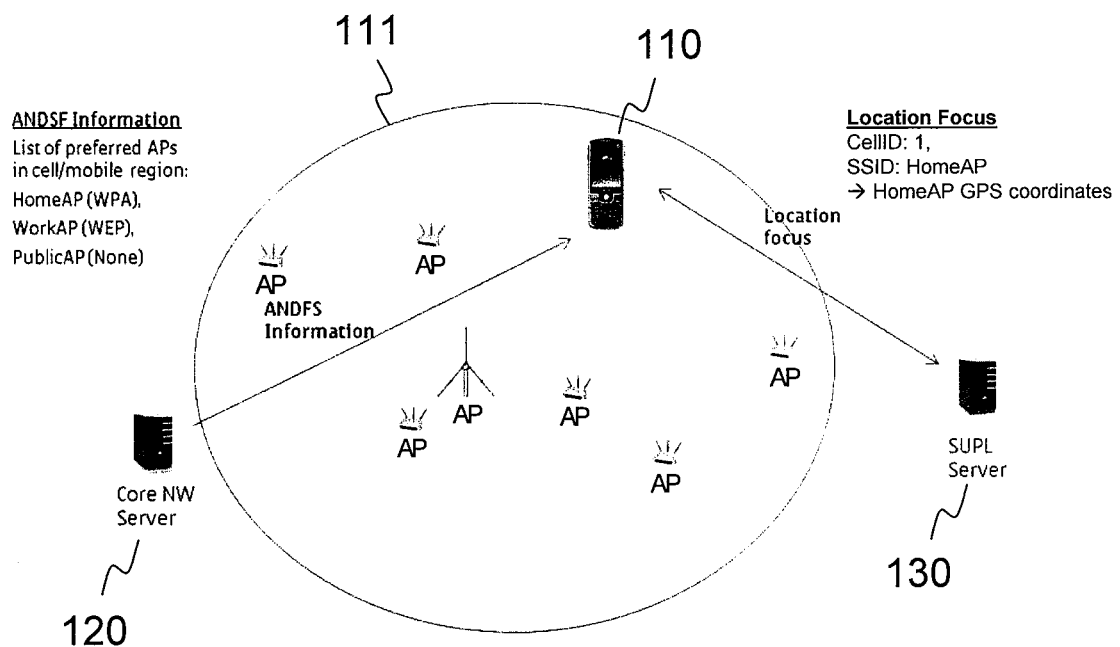
FIG. 1 shows an operation environment in an example embodiment of the invention.

FIG. 1 shows an operation environment in an example embodiment of the invention. A mobile communication device, that is, UE 110 communicates with the ANDSF server 120 over a defined communications interface. The ANDSF server 120 may be a core network server. The ANDSF server 120 provides the UE 110 with access network discovery and access network selection information.

In addition to the ANDSF server 120, the UE 110 communicates with a second server 130. The second server 130 is physically separate and distinct from the ANDSF server 120. The second server 130 (hereinafter referred to as the location server 130) provides the UE 110 with additional information assisting the UE 110 in access network discovery. In an example embodiment, the additional information (hereinafter referred to as access network discovery assistance information) contains position assistance data.

As to the operation of an example embodiment, the UE 110 first receives access network discovery information from the ANDSF 120. Although the UE 110 would be capable of initiating network discovery (that is, to determine which access network to scan for) based on this information only, certain benefits may be achieved if this information is complemented by access network discovery assistance information obtainable from the location server 130.

Accordingly, the UE 110 in an example embodiment requests with a message the access network discovery assistance information from the location server 130. Said requesting may be performed on the basis of the access network discovery information received from the ANDSF 120 or without it.

The location server 130 responds to the request message by transmitting a response message containing the access network discovery assistance information. The UE 110 receives the information, and subsequently initiates access network discovery based on the access network discovery and access network discovery assistance information. Alternatively, the UE 110 may, in practice, initiate the access network discovery based on the access network discovery information only, and continue the access network discovery based on the access network discovery and access network discovery assistance information when received. In either case the UE 110 uses the received access network discovery and access network discovery assistance information in network discovery. In an example embodiment, the UE 110 uses the received information in deciding when to start access network scanning.

In an example embodiment, the access network discovery information received from the ANDSF server 120 comprises a list of available networks which can be used for communication. The list may be a preference list. It may comprise one or more networks and the priority between them. Alternatively or additionally, the list may comprise one or more other parameters for use in the network discovery process.

In the example shown in FIG. 1, the access network discovery information comprises a list identifying access points (AP) in the current location or region or cell 111 of the UE 110. An access point herein may comprise, for example, a WLAN access point or another access point. The term access point may also cover various base stations providing access, such as WiMAX base stations.

The access points in the list may be in a preferred order. The access points may be identified by an appropriate local network or wireless local area network identifier, such a service set identifier (SSID) or similar.

In response to receiving the access network discovery information, the UE 110 in an example embodiment checks for more precise information (i.e., the access network discovery assistance information) from the location server 130. More precise herein may refer to more precise with terms of positioning. The access network discovery assistance information may be information stored at the location server 130 or information to which the location server 130 otherwise has an easy access. The information may be based on information gathered from other UEs. It may comprise a cell identifier (Cell ID) and/or geographical coordinates and/or received signal strength indicator (RSSI) of a specified cell or cells. The geographical coordinates herein may mean geographical coordinates of an access point.

In the example shown in FIG. 1, the location server 130 is a Secure User Plane Location (SUPL) server. The UE 110 sends in a request to the SUPL server 130 the identifier (cell ID) of its current cell 111 and/or identification information (SSID or similar) of an access point (or access points) received from the ANDSF server 120. The SUPL server 130 returns in its response to the UE 110 the geographical coordinates of the access point(s) serving the region or cell 111 and/or identified in the request.

In an alternative embodiment, the location server 130, in addition to returning access network discovery assistance information (such as position assistance data) concerning the requested specified access point(s), additionally returns to the UE 110 corresponding information about other related access points which locate in the same geographical region 111 (but whose information was not specifically requested). Thus the UE 110 may track, for example, base stations' Cell IDs and/or their signal strengths to define when the access points should be searched.

Figure 2:
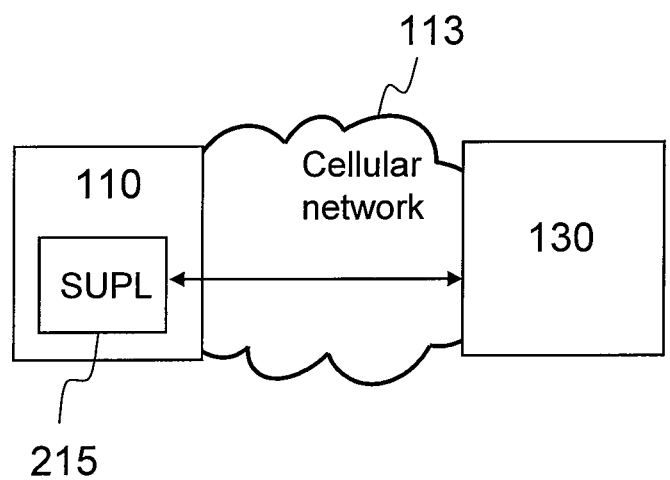
FIG. 2 shows communication with a location server in an example embodiment of the invention.

FIG. 2 shows communication with a location server in an example embodiment of the invention. In the example shown in FIG. 2, the location server 130 is a Secure User Plane Location (SUPL) server, and the UE 110 is a SUPL enabled terminal. The UE 110 comprises a SUPL subsystem 215 that communicates with the location server 130. In an example embodiment, communication between the UE 110 and the location server is carried out over a cellular network 113. In other embodiments, instead of communicating over a cellular network, communication between the UE 110 and the location server 130 is carried out using another available (access) technology.

Figure 3:
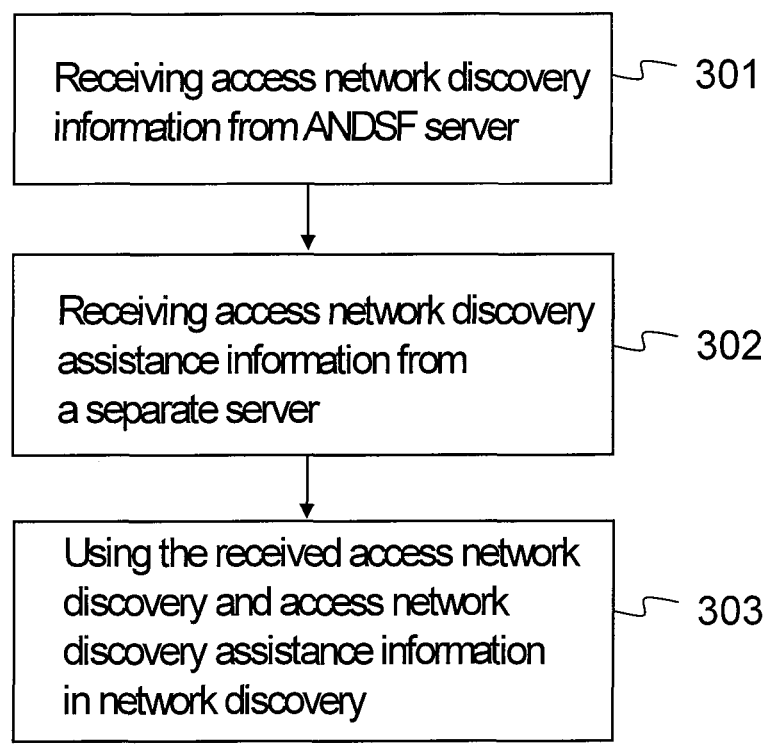
FIG. 3 is a flow diagram showing operations in an apparatus in accordance with an example embodiment of the invention.

FIG. 3 is a flow diagram showing operations in an apparatus in accordance with an example embodiment of the invention. The apparatus may be the UE 110 or another mobile communications device. In step 301, the apparatus receives access network discovery information from an access network discovery and selection function server. In step 302, the apparatus receives access network discovery assistance information from a second server (such as a location server) separate from the access network discovery and selection function server. And in step 303, the received access network discovery and access network discovery assistance information are used by the apparatus in network discovery.

Figure 4:
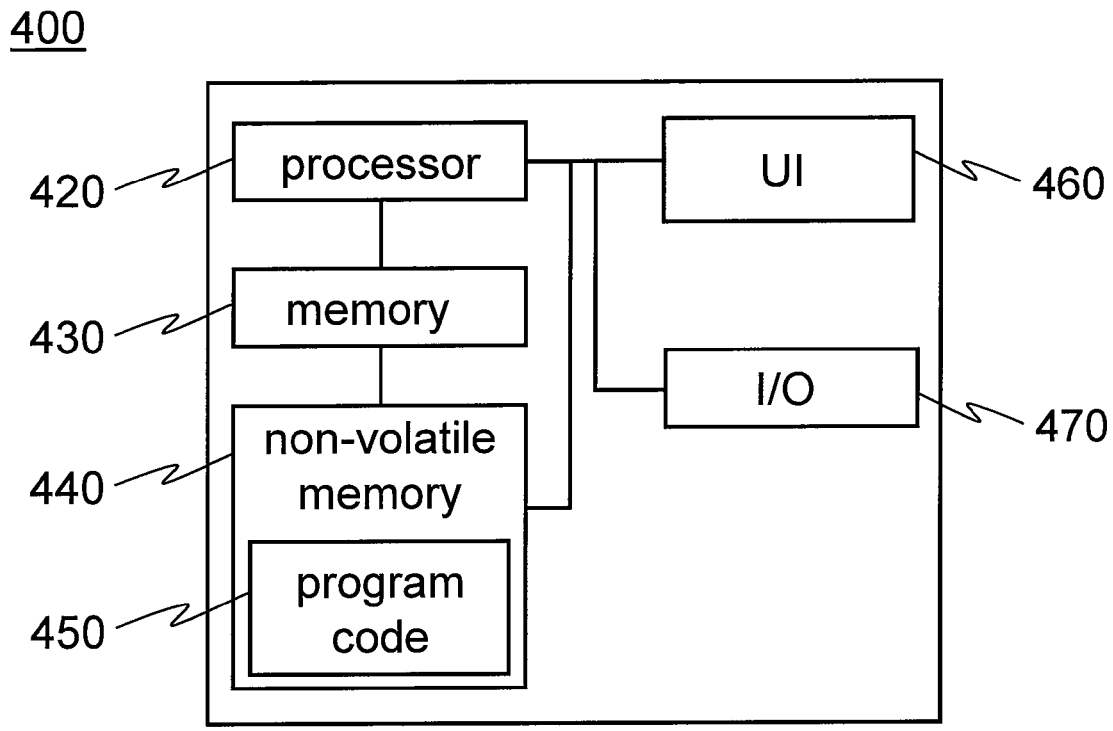
FIG. 4 shows an example block diagram of an apparatus according to an example embodiment of the invention.

FIG. 4 shows an example block diagram of an apparatus 400 according to an example embodiment of the invention. The apparatus 400 is suitable for functioning as the UE 110 described in the foregoing.

The apparatus 400 comprises at least one non-volatile memory 440 configured to store computer programs or software comprising computer program code 450. The apparatus 400 further comprises at least one processor 420 for controlling the operation of the apparatus 400 using the computer program code 450, a work memory 430 for running the computer program code 450 by the at least one processor 420, and an input/output system 470 for communicating with other entities or apparatuses. The input/output system 470 comprises one or more communication units or modules providing communication interfaces to different access networks. This or these units or modules may operate as a receiver or receivers configured to receive access network discovery information from the ANDSF server 120 and to receive access network discovery assistance information from the location server 130 separate from the ANDSF server 120, as well as a transmitter or transmitters to transmit towards the ANDSF server 120 and the location server 130. The apparatus 400 comprises a user interface 460 enabling a user to use the device. The at least one processor 420 can control the operation of the input/output system 470 in accordance with the program code 450.

The at least one processor 420 may be a master control unit (MCU). Alternatively, the at least one processor 420 may be a microprocessor, a digital signal processor (DSP), an application specific integrated circuit (ASIC), a field programmable gate array, a microcontroller or a combination of such elements.

The apparatus 400 is generally operated by the at least one processor 420 based on the program code 450. As to the operations of the embodiments of the invention, when the computer program code 450 is executed by the at least one processor 420, this causes the apparatus 400 to implement operations in different embodiments. These operations can, among other things, comprise receiving access network discovery and discovery assistance information, and using the received information in network discovery.

Figure 5:
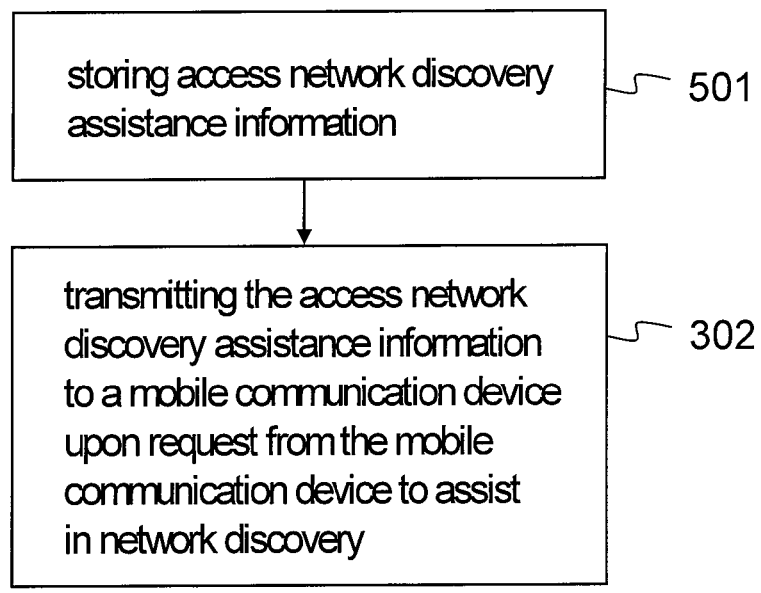
FIG. 5 is a flow diagram showing operations in another apparatus in accordance with an example embodiment of the invention.

FIG. 5 is a flow diagram showing operations in another apparatus in accordance with an example embodiment of the invention. That apparatus may be a location server, such as a SUPL server or similar, separate from an access network discovery and selection function server. In step 501, access network discovery assistance information is stored in the apparatus. The access network discovery assistance information may be received from mobile communication devices, such as mobile terminals. In step 502, the access network discovery assistance information is transmitted to a mobile communication device to assist in network discovery and to complement access network discovery information received from the access network discovery and selection function server.

Figure 6:
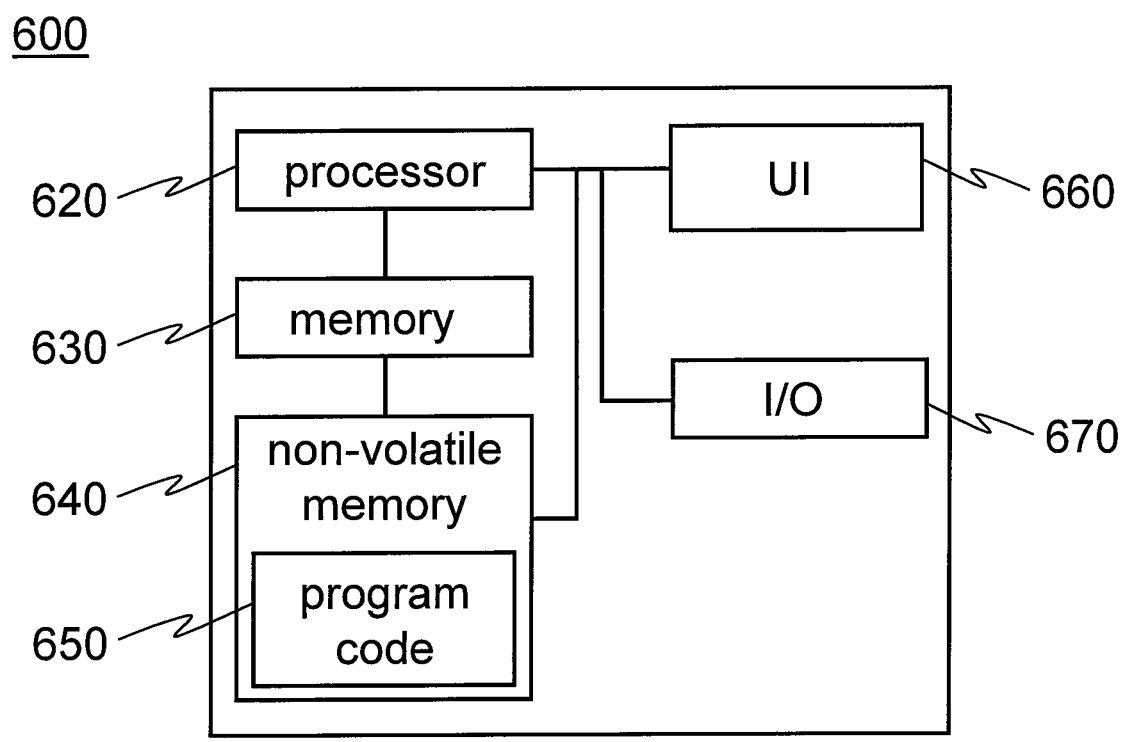
FIG. 6 shows an example block diagram of an apparatus according to another example embodiment of the invention.

FIG. 6 shows an example block diagram of an apparatus 600 according to another example embodiment of the invention. The apparatus 600 is suitable for functioning as the location server 130 described in the foregoing.

The apparatus 600 comprises at least one non-volatile memory 640 configured to store computer programs or software comprising computer program code 650. The apparatus 600 further comprises at least one processor 620 for controlling the operation of the apparatus 600 using the computer program code 650, a work memory 630 for running the computer program code 650 by the at least one processor 620, and an input/output system 670 for communicating with other entities or apparatuses. The input/output system 670 comprises one or more communication units or modules providing communication interfaces towards mobile communication devices. This or these units or modules may operate as a receiver or receivers configured to gather access network discovery assistance information from the mobile communication devices, as well as a transmitter or transmitters to transmit towards the mobile communication devices. The apparatus 600 comprises in an embodiment a user interface 660 enabling an operator to configure the device. The at least one processor 620 can control the operation of the input/output system 670 in accordance with the program code 650.

The at least one processor 620 may be a master control unit (MCU). Alternatively, the at least one processor 620 may be a microprocessor, a digital signal processor (DSP), an application specific integrated circuit (ASIC), a field programmable gate array, a microcontroller or a combination of such elements.

The apparatus 600 is generally operated by the at least one processor 620 based on the program code 650. As to the operations of the embodiments of the invention, when the computer program code 650 is executed by the at least one processor 620, this causes the apparatus 600 to implement operations in different embodiments. These operations can, among other things, comprise receiving access network discovery assistance information from mobile communication devices, storing access network discovery assistance information in the at least one non-volatile memory 640, receiving a request from a mobile communication device to provide that mobile communication device with access network discovery assistance information, processing the request, and transmitting the requested information to the mobile communication device.

Without in any way limiting the scope, interpretation, or application of the claims appearing below, a technical effect of one or more of the example embodiments disclosed herein is an enhanced access network discovery or making access network discovery more efficient and/or more intelligent. Another technical effect of one or more of the example embodiments disclosed herein is to use a server different from the access network discovery and selection function server to keep updated dynamic data which can be used for more precise network discovery. Another technical effect of one or more of the example embodiments disclosed herein is to use information stored to a SUPL server used for location estimation to define where an access point, such as a WLAN access point, can be found more precisely. Another technical effect of one or more of the example embodiments disclosed herein is to contribute to the decision making process in which it is decided when to start access network scanning.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

If desired, the different functions discussed herein may be performed in a different order and/or concurrently with each other. Furthermore, if desired, one or more of the above-described functions may be optional.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus, comprising:
   a receiver module configured to receive
      access network discovery information, comprising first precision positioning information, from an access network discovery and selection function server, wherein said access network discovery information corresponds to a current location of said apparatus; and
      access network discovery assistance information, comprising second precision positioning information that is more precise than the first precision positioning information, from a location server separate from the access network discovery and selection function server; and
   a processor configured to use the received access network discovery and access network discovery assistance information in network discovery;
   wherein the apparatus is configured to request the access network discovery assistance information from the location server in response to said receipt of the access network discovery information from the access network discovery and selection function server, and
   wherein said access network discovery assistance information comprises positioning-precise information, wherein said positioning-precise information is based on multi-mobile communication device-gathered information.

2. An apparatus according to claim 1, the access network discovery information comprising information on available networks.

3. An apparatus according to claim 2, the information on available networks comprising a list of one or more networks and their mutual priority.

4. An apparatus according to claim 1, the access network discovery information comprising one or more parameters to be used in network discovery.

5. An apparatus according to claim 1, the access network discovery assistance information being selected from the group consisting of: cell identifier(s), coordinates of one or more access points in the area, and received signal strength indicator of specified cell(s) as identified by the cell identifier(s).

6. An apparatus according to claim 1, the access network discovery assistance information comprising information about a plurality of access points located close to the same geographical location as the apparatus.

7. A method, comprising:
   receiving access network discovery information, comprising first precision positioning information, in an apparatus from an access network discovery and selection function server, wherein said access network discovery information corresponds to a current location of said apparatus;
   requesting access network discovery assistance information, comprising second precision positioning information that is more precise than the first precision positioning information, from a location server in response to said receipt of the access network discovery information from the access network discovery and selection function server;
   receiving access network discovery assistance information in said apparatus from the location server, wherein said location server is separate from the access network discovery and selection function server; and
   using by said apparatus the received access network discovery and access network discovery assistance information in network discovery,
   wherein said access network discovery assistance information comprises positioning-precise information, wherein said positioning-precise information is based on multi-mobile communication device-gathered information.

8. An apparatus, comprising:
   a memory configured to store access network discovery assistance information; and
   a transmitter configured to transmit the access network discovery assistance information to a mobile communication device to assist in network discovery, the apparatus being separate from an access network discovery and selection function server that sends access network discovery information, comprising first precision positioning information, to said mobile communication device,
   wherein the apparatus is configured to transmit the access network discovery assistance information, comprising second precision positioning information that is more precise than the first precision positioning information, to the mobile communication device based on the access network discovery information received by the mobile communication device from the access network discovery and selection function server,
   wherein said apparatus is a location server, wherein said access network discovery information corresponds to a current location of said mobile communication device, and
wherein said access network discovery assistance information comprises positioning-precise information, wherein said positioning-precise information is based on multi-mobile communication device-gathered information.

9. An apparatus according to claim 8, the access network discovery assistance information being information that is gathered from other mobile communication devices.

10. An apparatus according to claim 8, the apparatus being configured to transmit the access network discovery assistance information in response to receiving a request from the mobile communication device.

11. An apparatus according to claim 8, the access network discovery assistance information being position assistance data.

12. An apparatus according to claim 8, the access network discovery assistance information being selected from the group consisting of: cell identifier(s), coordinates of one or more access points in the area, and received signal strength indicator of specified cell(s) as identified by the cell identifier(s).

13. An apparatus according to claim 8, the access network discovery assistance information comprising information about a plurality of access points located close to the same geographical location as the mobile communication device.

14. A method, comprising:
storing access network discovery assistance information in an apparatus; and
transmitting the access network discovery assistance information to a mobile communication device to assist in network discovery, the apparatus being separate from an access network discovery and selection function server that sends access network discovery information, comprising first precision positioning information, to said mobile communication device;
wherein the apparatus is configured to transmit the access network discovery assistance information, comprising second precision positioning information that is more precise than the first precision positioning information, to the mobile communication device based on the access network discovery information received by the mobile communication device from the access network discovery and selection function server,
wherein said apparatus is a location server,
wherein said access network discovery information corresponds to a current location of said mobile communication device, and
wherein said access network discovery information corresponds to a current location of said mobile communication device, and
wherein said access network discovery assistance information comprises positioning-precise information, wherein said positioning-precise information is based on multi-mobile communication device gathered information.

15. A method according to claim 14, comprising:
gathering said discovery assistance information from other mobile communication devices.

16. A method according to claim 14, comprising:
transmitting the access network discovery assistance information in response to receiving a request from the mobile communication device.

17. A computer program product comprising a non-transitory computer readable storage medium having computer executable program code stored thereon which, when executed by at least one processor of an apparatus, causes the apparatus to perform:
receiving access network discovery information, comprising first precision positioning information, from an access network discovery and selection function server, wherein said access network discovery information corresponds to a current location of said apparatus;
requesting access network discovery assistance information, comprising second precision positioning information that is more precise than the first precision positioning information, from a location server in response to said receipt of the access network discovery information from the access network discovery and selection function server;
receiving access network discovery assistance information from the location server, wherein said location server is separate from the access network discovery and selection function server; and
using the received access network discovery and access network discovery assistance information in network discovery,
wherein said access network discovery assistance information comprises positioning-precise information, wherein said positioning-precise information is based on multi-mobile communication device-gathered information.

18. A computer program product comprising a non-transitory computer readable storage medium having computer executable program code stored thereon which, when executed by at least one processor of an apparatus, causes the apparatus to perform:
storing access network discovery assistance information; and
transmitting the access network discovery assistance information to a mobile communication device to assist in network discovery, the apparatus being separate from an access network discovery and selection function server that sends access network discovery information, comprising first precision information, to said mobile communication device;
wherein the apparatus is configured to transmit the access network discovery assistance information, comprising second precision positioning information that is more precise than the first precision positioning information, to the mobile communication device based on the access network discovery information received by the mobile communication device from the access network discovery and selection function server,
wherein said apparatus is a location server,
wherein said access network discovery information corresponds to a current location of said mobile communication device, and
wherein said access network discovery assistance information comprises positioning-precise information, wherein said positioning-precise information is based on multi-mobile communication device-gathered information.

* * * * *